United States Patent [19]

Gannon

[11] Patent Number: 5,081,693
[45] Date of Patent: Jan. 14, 1992

[54] THERMAL IMAGER ARRANGEMENTS

[75] Inventor: Raymond Gannon, Basildon, United Kingdom

[73] Assignee: GEC-Marconi Limited, Middlesex, United Kingdom

[21] Appl. No.: 417,514

[22] Filed: Oct. 5, 1989

[30] Foreign Application Priority Data

Oct. 5, 1988 [GB] United Kingdom ............... 8823410

[51] Int. Cl.$^5$ .............................................. G06K 9/20
[52] U.S. Cl. ...................... 382/58; 358/113; 250/332; 250/334
[58] Field of Search ............ 382/18, 41, 43, 50, 382/51, 58; 358/133, 135, 113, 166; 250/330, 332, 334

[56] References Cited

U.S. PATENT DOCUMENTS

| | | | |
|---|---|---|---|
| 4,419,692 | 12/1983 | Modisette et al. | 358/113 |
| 4,719,350 | 1/1988 | Alm | 250/332 |
| 4,771,267 | 9/1988 | Russell, Jr. et al. | 382/50 |
| 4,948,964 | 8/1990 | Gohlke | 250/334 |
| 4,963,036 | 10/1990 | Drisko et al. | 382/51 |

Primary Examiner—David K. Moore
Assistant Examiner—Jose L. Couso
Attorney, Agent, or Firm—Spencer & Frank

[57] ABSTRACT

Pictorial data from a thermal imager is applied on a line to a RAM at which a histogram representing the numerical distribution of pixel values is produced. This is applied to a microprocessor which uses the histogram to produce a transform to control the gain and offset of the data output of the processor. The microprocessor sets a look-up table to apply the transform to the received data, the output of the table being converted to analogue form at an analogue-to-digital converter.

12 Claims, 4 Drawing Sheets

THERMAL IMAGER ARRANGEMENTS

BACKGROUND OF THE INVENTION

This invention relates to thermal imager arrangements and more particularly to arrangements in which data to be processed is digital picture data derived from a thermal imager.

It is often wished to process the raw picture data received from a thermal imager to select a particular temperature range of interest and to enhance the contrast of a viewed scene. Conventionally, the output produced by a thermal imager is in digital form, because of the nature of devices used for sensing, and in order to ease further processing.

The present invention seeks to provide an improved data processing apparatus which is particularly applicable to digital data received from a thermal imager.

SUMMARY OF THE INVENTION

According to the invention, a thermal imager arrangement comprises means arranged to receive pictorial data in digital form from an imager, and means arranged to apply a transform to the digital data to produce an output signal, the gain and offset of which compared to the received data are determined by the transform which is applied, the output of the processor being available in digital and analogue form simultaneously.

By using the present invention digital information may be used in conjunction with an anologue image to provide for example overlays to enable the correlation of digital, or digitally derived information, with an image.

Also the benefits of digitisation may be retained as it is not necessary, unlike conventional apparatus, to convert the data into analogue form in order to select a particular portion for the output signal. The offset may be imposed on the received data by applying a transform in which picture data of less than a particular value or greater than another value is rejected in the output signal. Thus, where the pictorial data is derived from a thermal imager, those picture elements, or "pixels", having values respresenting temperatures outside a set range may be removed from the output signal. By controlling the gain of the output signal, the contrast may be enhanced. It is also possible to set the transform so as to correct for distortions which it is known would otherwise appear in the output, for example gamma correction may be made.

The full range digital signal which is received may be retained, Which may be advantageous for some applications in which it is wished to have both a "windowed" analogue signal and a full range digital signal. This arrangement is particularly advantageous when desiring to compare the original image and the enhanced image in certain portions of an image, merely by switching from one output to the other.

In addition to this it may be advantageous to have overlays. These overlays may be derived from raw digital signal from the thermal imager. The fact that digital data is available simultaneously with the processed analogye output signal enables this to be achieved.

Preferably, the transform which is applied is determined by monitoring the received data. This may be achieved by sorting the received data into a histogram to give a representation of the numerical distribution of the different value of data received. The optimum distribution of data values which it is wished to obtain is known and thus, by using the information present in the histogram, the transform required to produce the desired output distribution may be determined. It may be advantageous to also include a facility for setting the transform manually without reference to the values of the received data.

Where the pictorial data is received in picture frames separated by blanking periods, the histogram may be produced for each frame of data and the transform determined during field blanking periods.

BRIEF DESCRIPTION OF THE DRAWINGS

It is preferred that the transform is applied to the received data by using a look-up table.

One way in which the invention may be performed is now described by way of example, with reference to the accompanying drawings, in which.

DESCRIPTION OF THE PREFERRED EMBODIMENT

Figure 1:
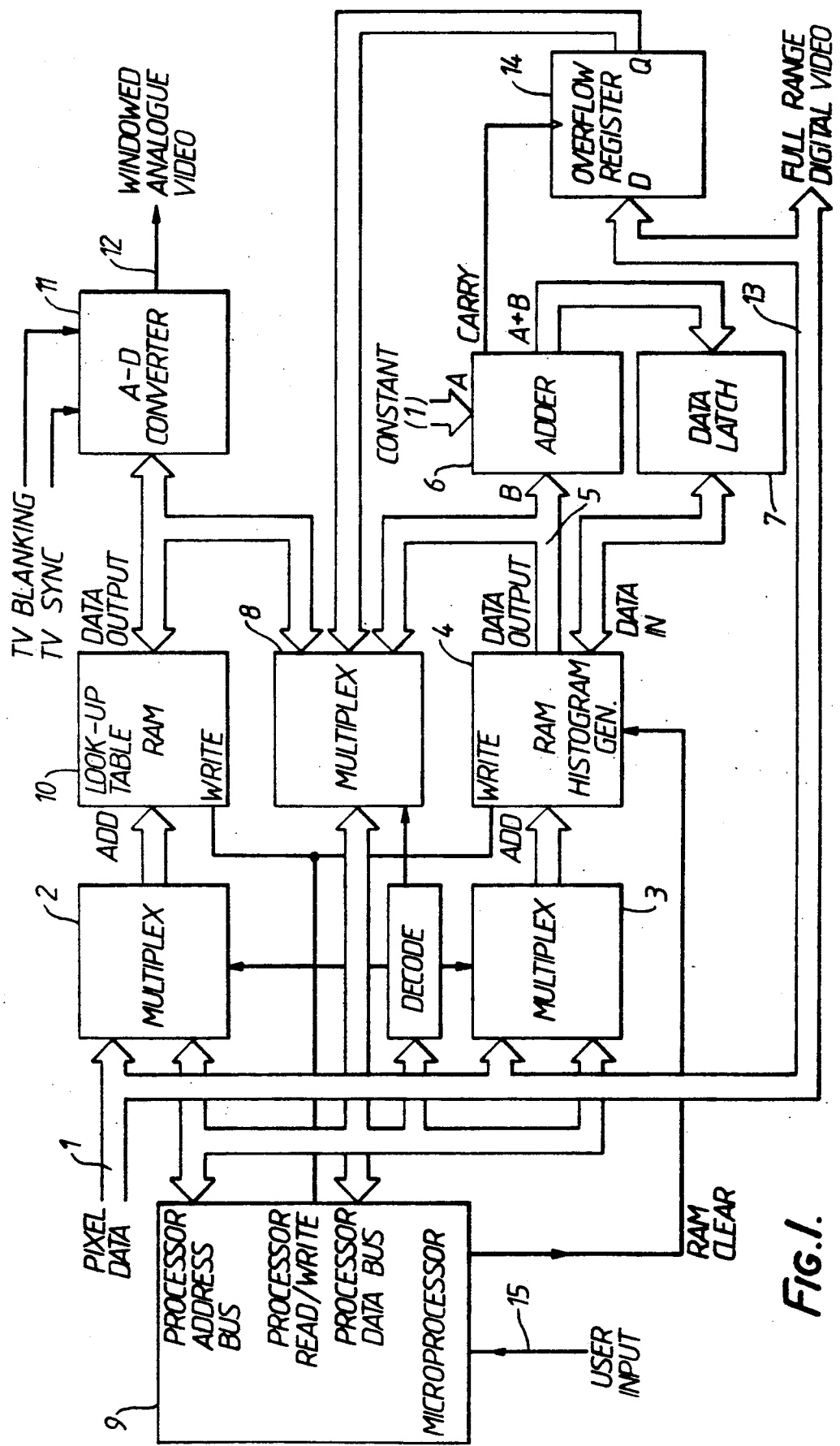
FIG. 1 is a schematic block diagram of apparatus in accordance with the invention.
Figure 2:
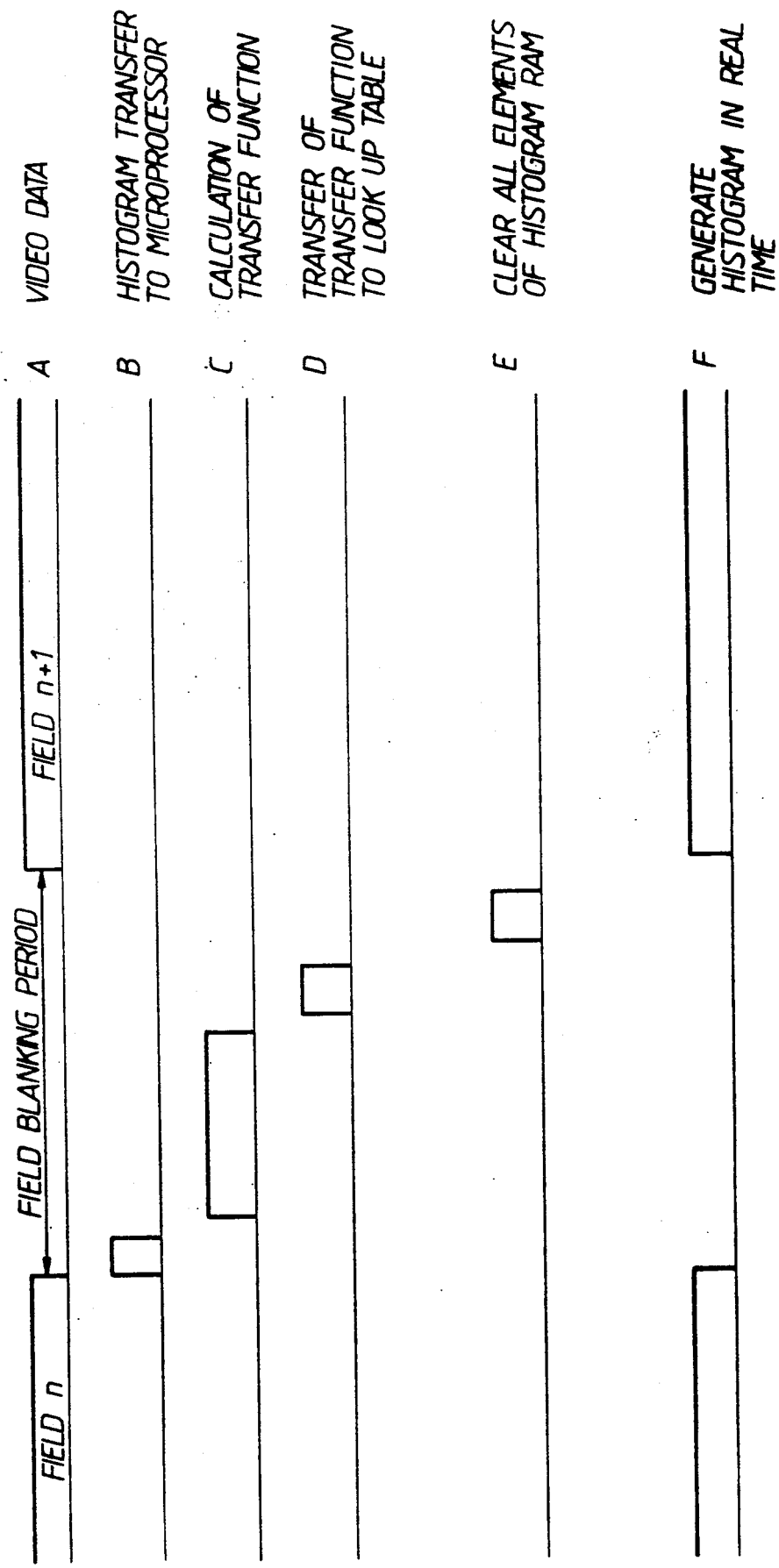
FIGS. 2, 3,and 4 are explanatory diagrams relating to the operation of the apparatus shown in FIG. 1; and derived directly from the digital processor.

With reference to FIG. 1, frames of picture data, represented on line A of FIG. 2, are received from a thermal imager (not shown) on line 1. The pictorial data is applied in parallel to first and second multiplexers 2 and 3. The data received by the second multiplexer 3 is transmitted to a first RAM 4 which is arranged to generate a histogram for each frame of pixel data which it receives.

Figure 3:
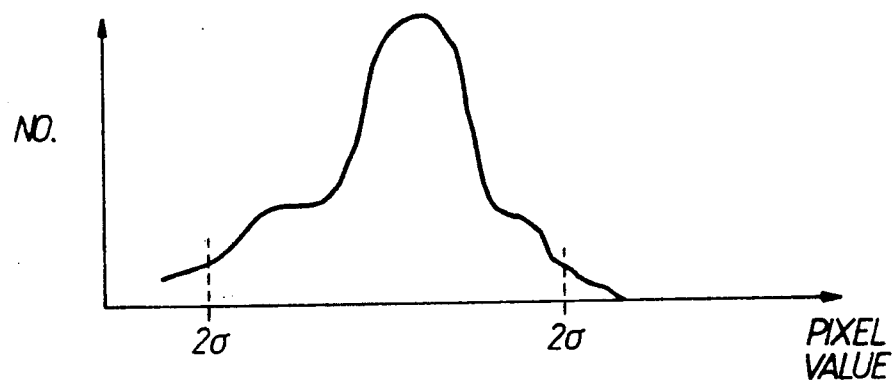

Initially, at the beginning of a field period, the RAM 4 is cleared (line E of FIG. 2). The first data digit received by it from the multiplexer 3 is allocated an address for the RAM 4 and a data value of zero is produced at the data output 5. The output signal at 5 is applied to an adder 6 which increments the pixel count by one, giving for the first pixel received a count of 1. This is fed back to the RAM 4 via a data latch 7 and written to the memory location corresponding to the value of the pixel received. The next time a pixel having this value is received by the RAM 4, the output at 5 is 1, to which 1 is added at adder 6 and the address corresponding to this pixel value in RAM 4 is up-dated to have a value of 2. Thus, as a complete frame of pixel data is applied to the RAM 4, a histogram showing the numerical distribution of pixel values is built up. FIG. 3 schematically illustrates such a histogram.

Figure 4:
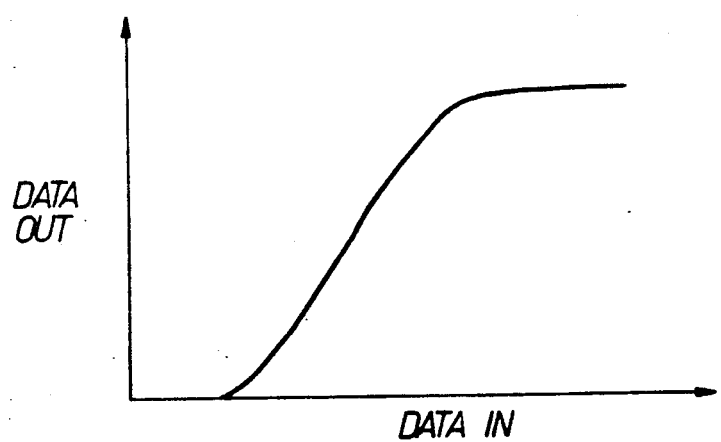

At the beginning of the field blanking period following the frame from which the histogram has been generated, the histogram data is transferred via a multiplexer 8 to a microporcessor 9 which uses the information to determine the transform which must be applied to the received data to obtain an output signal having the desired gain and offset. Such a transform is schmatically shown in FIG. 4.

In this particular embodiment of the invention, the microprocessor 9 first of al determines the range of output values which are to be selected for the output using an algorithm which requires reduced processing overheads compared with conventional statistical methods. Firstly, the "two sigma" points of the histogram data set are estimated. The two sigma points are those values of the received data which, after application of the transform, correspond to peak black and peak white levels. If the histogram is amono-modal, symmetrical Gaussian distribution, the two sigma points are those data values between which 95% of the data points are found.

Therefore, 5% of the data points lie outside the two sigma points. To determine the lower two sigma point, initially, the minimum possible pixel value is selected and the number of pixels having that value is noted. Then the next pixel value is observed and the number of pixels at that value added to the number of those at the first value. The same operation is carried out for each successive pixel value until the number of pixels summed is greater than 2.5% of the total number of pixels in a frame. The value of the pixel at which this summation result is reached is then set as the lower threshold. The upper threshold is obtained in a similar manner, except that the maximum pixel value is the starting point and the pixel values are checked downwards from this.

Once the two sigma points have been determined, the optimum transfer function is determined by comparing the received data distribution, ordered as the histogram, and the distribution which is desired at the output. The microprocessor 9 then sets the address values of a second RAM 10 so that it acts as a look-up table to apply the transform to a frame of received data. Each pixel value applied to the look-up table forms an address to the RAM 10. The output of the RAM 10 is the processed signal in digital form on which a desired gain and offset have been imposed. This is applied to a digital-to-analogue converter 11 giving a "windowed" analogue output signal on line 12. The full range digital video signal is also available at the output of the processor on line 13.

In some operating circumstances, the pictorial data on line 1 may occupy only a few pixel values and overflow may occur in the first RAM 4 as the histogram is built up. In this case, the pixel value at which the overflow is reached is taken to be the centre of the data distribution and a suitable signal applied via overflow register 14 to multiplexer 8 and thence to the microprocessor 9. The microprocessor 9 includes means for applying a predetermined transfer function when overflow conditions obtain and loads the look-up table of the RAM 10 accordingly.

The microprocessor 9 also provides clocking and control signals to other parts of the processor circuit.

It is possible if so desired for an operator to apply a transform on line 15 to the microprocessor 9 to override the transform determined from the received data.

A time-weighting may be applied by the microprocessor 9 if otherwise rapid changes in scene detail would unduly modify the overall viewed scene. Of course, if desired, a delay may be incorporated in the processed video data by delaying the received data in a frame store.

Although in the illustrated embodiment of the invention, the lower and upper threshold values are the two sigma points, they could be some other points and may be user definable. Alternatively the system may be adapted to detect a rapid rise in frequency of occurance of points at a narrow bandwidth and thereby detect the rate of increase.

Figure 5:
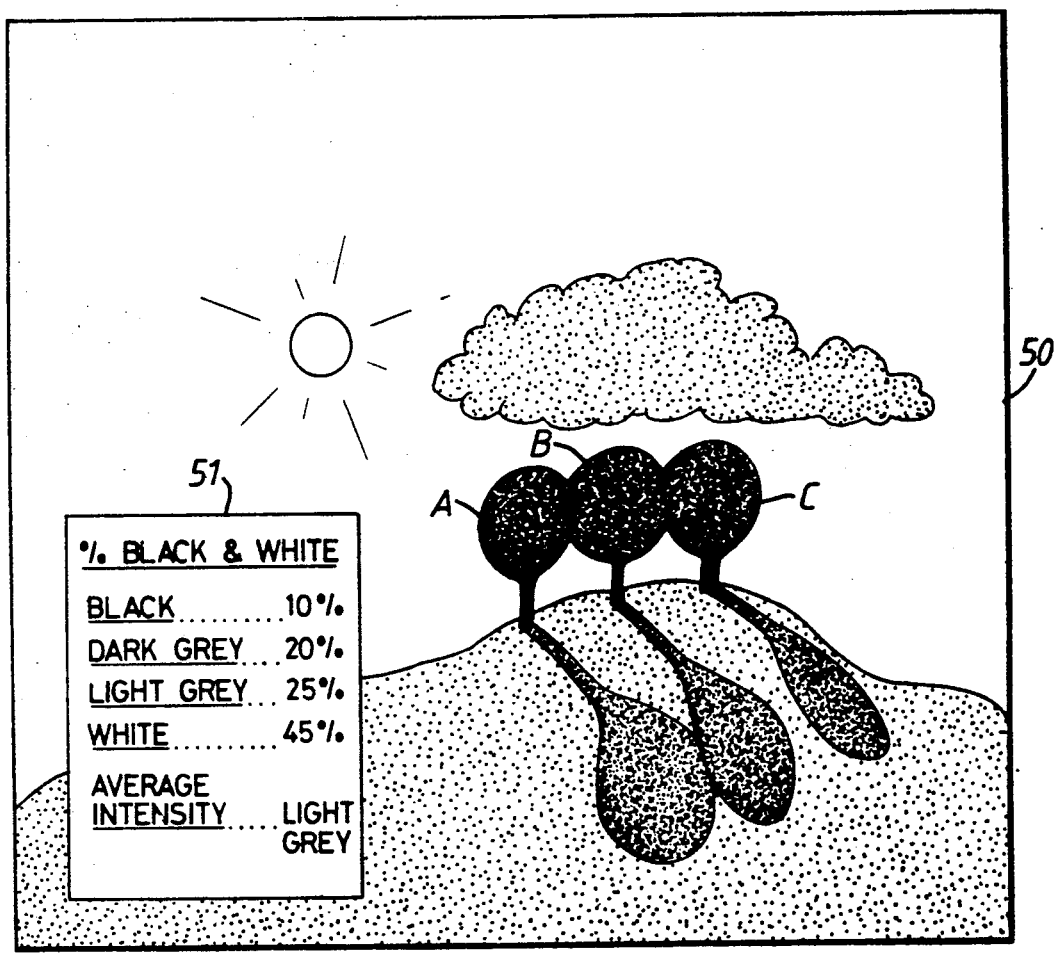
FIG. 5 is a schematic diagram of a VDU with an analogue image and an overlay derived from digital data.

Referring briefly to FIG. 5, analogue information derived from a thermal imager is displayed on a VDU 50. The scene has three trees, which are shown as A, B and C on the VDU screen. An overlay 51 is displayed over one corner of the screen. The overlay displays digital information derived from the raw data representing the intensity of the radiation in the image. This may be related, in one example, to the temperature of different objects within the field of view.

I claim:

1. A thermal imager data processing arrangement comprising:
    an input for receiving a full range of pictorial digital data from a thermal imager;
    digital data processing means for applying a transform to the digital data to produce at a first output a windowed analogue signal for connection to a display means so that an image of enhanced contrast is formed on said display means, the gain and offset of said analogue signal compared to said received data being determined by the transform which is applied; and
    a second output at which the full range of pictorial data in digital form is available.

2. An arrangement as claimed in claim 1 wherein the transform which is applied is determined by monitoring the received data.

3. An arrangement as claimed in claim 1 and including means arranged to sort the received data into a histogram showing the numerical distribution of data digits according to their value.

4. An arrangement as claimed in claim 1, wherein the transform is applied to the received data by generating a look-up table according to the transform to which the received data is applied.

5. An arrangement as claimed in claim 1 wherein the pictorial data is received as successive frames separated by field blanking periods and in which each frame of data is ordered into a histogram showing the numerical distribution of the data digit values in that frame.

6. An arrangement as claimed in claim 5 and wherein the transform to be applied to a frame of data is determined during a field blanking period.

7. An arrangement as claimed in claim 1 including means for determining the transform without reference to the received data.

8. An arrangement as claimed in claim 4, including means arranged to sort the received data into a histogram having two sigma points and showing the numerical distribution of data digits according to value and wherein the two sigma points of the histogram are determined to calculate the range of values of the output signal.

9. An arrangement as claimed in claim 8 wherein the two sigma points are determined by summing the numnber of data digits at each value successively, from the lowest value for the low two sigma point, and from the highest value for the high two sigma point until a predetermined percentage of the total number of data digits making up the histogram is exceeded, the values at which the sums exceed the percentage being allocated as the two sigma points.

10. An arrangement as claimed in claim 1 and including means for applying a predetermined transform to the received data when substantially all the data is contained within a relatively small range of data values.

11. An arrangement according to claim 1 wherein means are provided to display information derived from the analogue data simultaneously with information derived from the digital data.

12. A thermal data processing arrangement comprising:
- an input for receiving successive frames of pictorial digital data from a thermal imager; and
- digital data processing means for applying a transform to the digital data to produce at a first output a windowed signal for connection to a display means so that an image of enhanced contrast is formed on said display means for each frame of said data, the gain and offset of said windowed signal as compared to said received data being determined by the transform which is applied, said data processing means:
- producing a histogram for each frame of received data showing the numerical distribution of the data digits according to their value;
- selecting a range of output values from the histogram which after application of the transform will correspond to peak black and peak white levels, the range being determined by summing the number of data digits at each value successively from both the lowest and highest values to one of two points until a predetermined percentage of the total number of data digits making up the histogram is exceeded, said range of output values from said histogram corresponding to the values of said data digits at said two points; and
- applying a transform to the data in the selected range of output values from said histogram by generating a look-up table and applying each selected data digit to the look-up table, the output from said look-up table corresponding to said windowed outut signal.

* * * * *